United States Patent
Crump et al.

(10) Patent No.: US 6,320,874 B1
(45) Date of Patent: Nov. 20, 2001

(54) ESTABLISHING AND TERMINATING CONNECTIONS IN A MIXED PROTOCOL NETWORK

(75) Inventors: Richard Crump, Boston; Mark F. Leary, Franklin; Ellis L. Wong, Billerica, all of MA (US); Donald F. Betsinger, Fairport, NY (US); Shuching Shieh, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/167,839

(22) Filed: Oct. 7, 1998

(51) Int. Cl.[7] .................................................. H04L 12/66
(52) U.S. Cl. ........................................... 370/466; 370/401
(58) Field of Search .................................. 370/401, 466, 370/467; 709/203, 227, 228, 249, 223

(56) References Cited

U.S. PATENT DOCUMENTS

| | | | |
|---|---|---|---|
| 5,021,949 | 6/1991 | Morten et al. | 364/200 |
| 5,182,748 | 1/1993 | Sakata et al. | 370/94.1 |
| 5,535,199 | * 7/1996 | Amiri et al. | . |
| 5,623,605 | * 4/1997 | Keshav et al. | 395/200.17 |
| 5,903,559 | * 5/1999 | Acharya et al. | 370/355 |
| 5,918,022 | 6/1999 | Batz et al. | 395/200.66 |
| 6,018,770 | * 1/2000 | Little et al. | 709/223 |
| 6,038,233 | * 3/2000 | Hamamoto | 370/401 |
| 6,111,924 | * 8/2000 | McKinley | 375/334 |
| 6,118,784 | * 8/2000 | Tsuchiya | 370/401 |
| 6,147,687 | * 11/2000 | Wanderski | 345/356 |

OTHER PUBLICATIONS

"TCP Connection Establishment and Termination," TCP/IP Illustrated, vol. I, W. Richard Stevens, Dec. 1994, pp. 229–234.

* cited by examiner

*Primary Examiner*—Douglas Olms
*Assistant Examiner*—Ken Vanderpuye
(74) *Attorney, Agent, or Firm*—Bromberg & Sunstein LLP

(57) ABSTRACT

A method, translating apparatus, apparatus comprising a computer readable medium, and system for establishing and terminating an end-to-end connection in a mixed protocol communication network includes a translation function that communicates with a first device using a first communication protocol and a second device using a second communication protocol. In order to establish an end-to-end connection, the translation function receives a first control message from the second device initiating a connection between the second device and the translation function, completes a connection establishment procedure with the second device, receives a first data message from the second device, and transmits a second data message to the first device. In order to terminate an end-to-end connection, the translation function receives a first control message from the second device terminating the connection between the second device and the translation function, completes a link reset procedure with the first device, and then completes a connection termination procedure with the second device.

13 Claims, 8 Drawing Sheets

ESTABLISHING AND TERMINATING CONNECTIONS IN A MIXED PROTOCOL NETWORK

CROSS-REFERENCES TO RELATED APPLICATIONS

This patent application may be related to the following commonly-owned U.S. patent applications:

U.S. patent application Ser. No. 09/167,916 entitled CONNECTION ESTABLISHMENT AND TERMINATION IN A MIXED PROTOCOL NETWORK, now U.S. Pat. No. 6,226,676 filed on even date herewith, and hereby incorporated by reference in its entirety;

U.S. patent application Ser. No. 09/167,950 entitled ERROR RECOVERY IN A MIXED PROTOCOL NETWORK, filed on even date herewith, and hereby incorporated by reference in its entirety;

U.S. patent application Ser. No. 09/167,746 entitled EFFICIENT RECOVERY OF MULTIPLE CONNECTIONS IN A COMMUNICATION NETWORK, filed on even date herewith, and hereby incorporated by reference in its entirety; and U.S. patent application Ser. No. 09/167,811 entitled TRANSLATOR MEMORY MANAGEMENT SYS, filed on even date herewith, and hereby incorporated by reference in its entirety.

FIELD OF THE INVENTION

The present invention relates generally to data communication networks, and, more particularly, to connection control in a mixed protocol network.

BACKGROUND OF THE INVENTION

In today's information age, data communication networks are becoming ever more pervasive as an ever-increasing number of communication consumers require access to on-line computer resources. To that end, many data communication networks are evolving to meet the needs of these communication consumers. As these data communication networks evolve, it often becomes necessary to combine or integrate network segments that support different communication protocols.

The most common problem that arises when integrating or combining network segments that utilize different protocols is that the devices on one network segment using a first communication protocol do not communicate with the devices on another network segment using a second communication protocol. One solution is to convert or replace devices so that all devices utilize a common communication protocol. Unfortunately, this is often expensive, time-consuming, and disruptive to the network users. Furthermore, such conversion or replacement often requires that end-user applications be changed, which can further complicate the integration process and force end-users to learn new applications. Thus, a need has remained for a translation function that allows the devices utilizing the first communication protocol to communicate with the devices using the second communication protocol.

SUMMARY OF THE INVENTION

In accordance with one aspect of the invention, a method, translating apparatus, apparatus comprising a computer readable medium, and system for establishing an end-to-end connection in a mixed protocol communication network includes a translation function that communicates with a first device using a first communication protocol and a second device using a second communication protocol. In order to establish an end-to-end connection, the translation function receives a first control message from the second device initiating a connection between the second device and the translation function, completes a connection establishment procedure with the second device, receives a first data message from the second device, and transmits a second data message to the first device.

In a preferred embodiment of the invention, the first communication protocol is an X.25 protocol. In such a preferred embodiment, transmitting the second data message to the first device involves transmitting an X.25 data packet to the first device.

In a preferred embodiment of the invention, the second communication protocol is a Transmission Control Protocol (TCP). In such a preferred embodiment, receiving the first control message from the second device initiating a connection between the second device and the translation function involves receiving a TCP SYN message from the second device. Also in such a preferred embodiment, completing the connection establishment procedure with the second device involves transmitting a TCP SYN message to the second device and receiving a TCP SYN/ACK message from the second device. Receiving the first data message from the second device involves receiving a TCP data segment from the second device.

In accordance with another aspect of the invention, a method, translating apparatus, apparatus comprising a computer readable medium, and system for terminating an end-to-end connection in a mixed protocol communication network includes a translation function that communicates with a first device using a first communication protocol and a second device using a second communication protocol. In order to terminate an end-to-end connection, the translation function receives a first control message from the second device terminating the connection between the second device and the translation function, completes a link reset procedure with the first device, and then completes a connection termination procedure with the second device.

In a preferred embodiment of the invention, the first communication protocol is an X.25 protocol. In such a preferred embodiment, completing the link reset procedure with the first device involves transmitting an X.25 reset message to the first device and receiving an X.25 confirm message from the first device.

In a preferred embodiment of the invention, the second communication protocol is a Transmission Control Protocol (TCP). In such a preferred embodiment, receiving the first control message from the second device terminating the connection between the second device and the translation function involves receiving a TCP FIN message from the second device. Also in such a preferred embodiment, completing the connection termination procedure with the second device involves transmitting a TCP FIN message to the second device and receiving a TCP FIN/ACK message from the second device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, a need has remained for a translation function that allows the devices using the first communication protocol to communicate with the devices using the second communication protocol. The present invention provides such a translation function by communicating with a first number of devices using the first communication protocol, communicating with a second number of devices using the second communication protocol, and performing appropriate protocol operations to allow end-to-end connections between devices using the first and second communication protocols to be established and terminated.

Figure 1A:
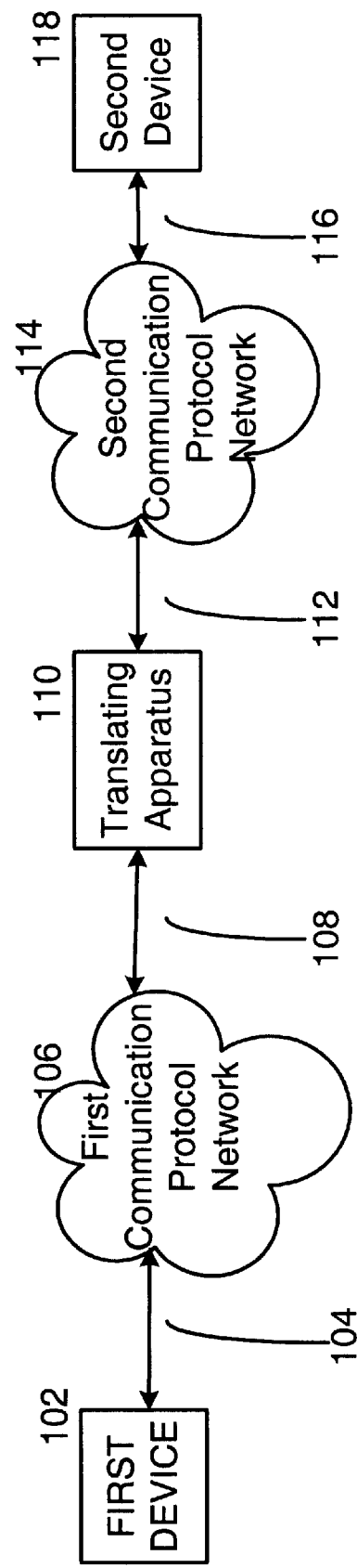
FIG. 1A is a block diagram of an exemplary data communication network in which a translating apparatus is used to allow a first device, which communicates with the translating apparatus over a first communication protocol network, to communicate with a second device, which communicates with the translating apparatus over a second communication protocol network.

FIG. 1A is a block diagram of an exemplary data communication network 100 in which a first device 102 that utilizes a first communication protocol communicates with a second device 118 that utilizes a second communication protocol through a translating apparatus 110. More specifically, the first device 102 is coupled to a first communication protocol network 106 by way of a first link 104. The translating apparatus 110 is also coupled to the first communication protocol network 106 by way of a second link 108. The first device 102 communicates with the translating apparatus 110 over the first communication protocol network 106 using the first communication protocol, and, in particular, over a connection that is established between the first device 102 and the translating apparatus 110.

Continuing to refer to FIG. 1, the second device 118 is coupled to a second communication protocol network 114 by way of a third link 116. The translating apparatus 110 is also coupled to the second communication protocol network 114 by way of a fourth link 112. The second device 118 communicates with the translating apparatus 110 over the second communication protocol network 114 using the second communication protocol, and in particular over a connection that is established between the second device 118 and the translating apparatus 110.

Figure 2A:
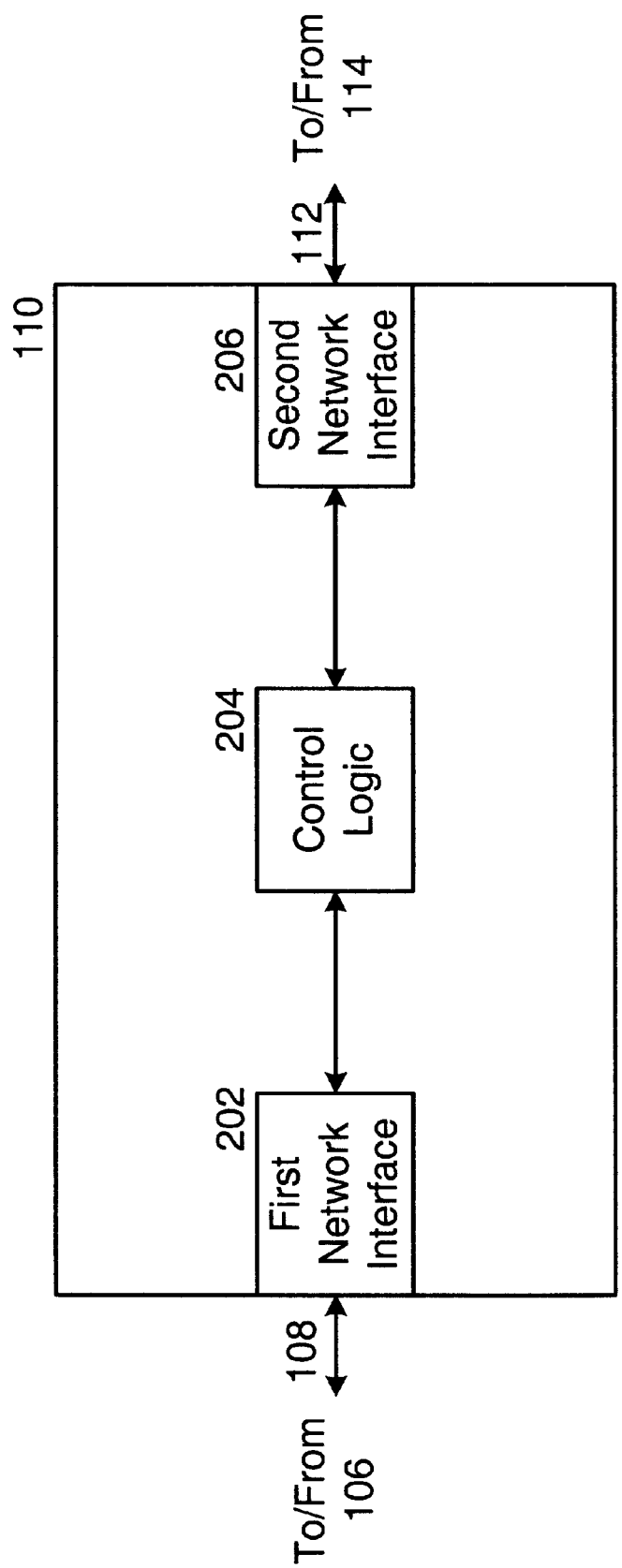
FIG. 2A is a block diagram of an exemplary translating apparatus including a first network interface for communicating with a first device over a first communication protocol network and a second network interface for communicating with a second device over a second communication protocol network.
Figure 2B:
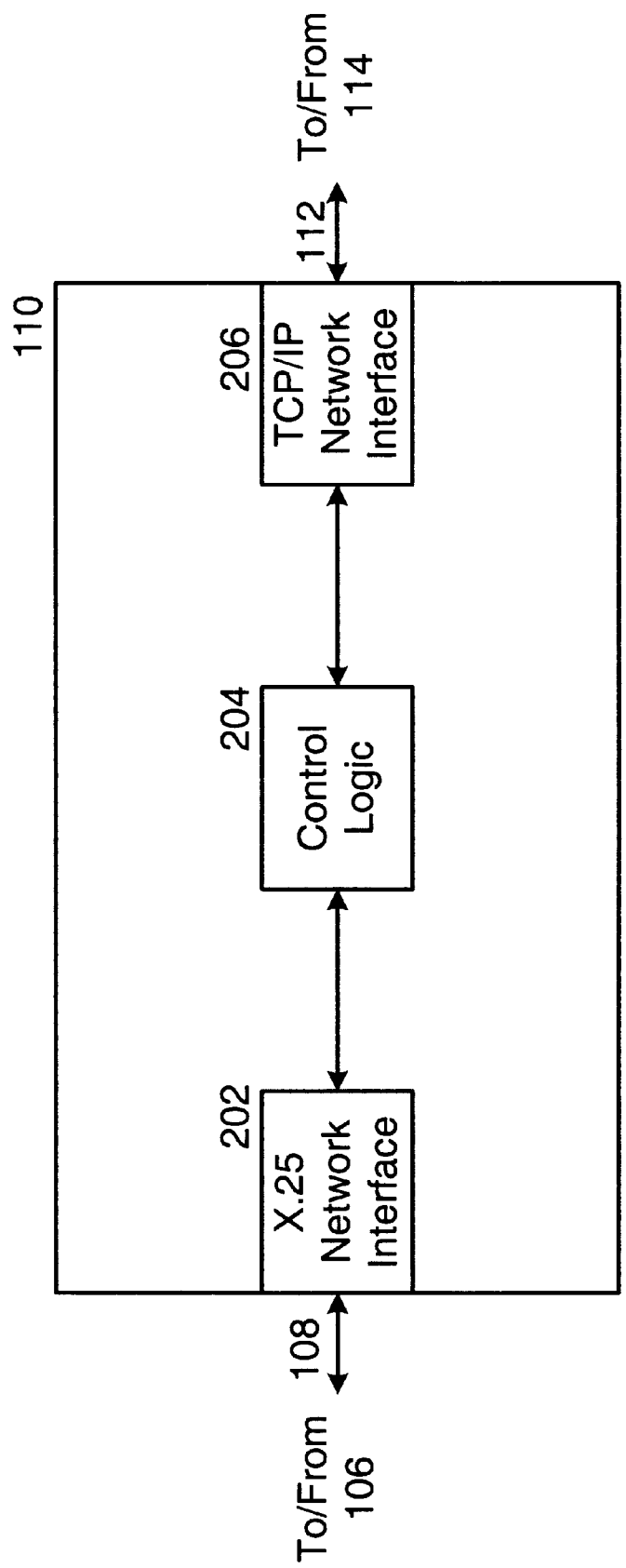
FIG. 2B is block diagram of a preferred embodiment of the exemplary translating apparatus including an X.25 network interface for communicating with an X.25 device over an X.25 network and a TCP/IP network interface for communicating with a TCP device over a TCP/IP network.

FIG. 2A is a block diagram of an exemplary translating apparatus 110 in accordance with a preferred embodiment of the present invention. The translating apparatus 110 includes a first network interface 202 that is couplable to the second link 108. The first network interface 202 includes logic enabling the translating apparatus 110 to communicate with the first device 102 over the first communication protocol network 106. More specifically, the first network interface 202 includes logic for receiving first communication protocol messages from the second link 108, and further includes logic for transmitting first communication protocol messages generated within the translating apparatus 110 onto the second link 108.

Continuing to refer to FIG. 2A, the translating apparatus 110 also includes a second network interface 206 that is couplable to the fourth link 112. The second network interface 206 includes logic enabling the translating apparatus 110 to communicate with the second device 118 over the second communication protocol network 114. More specifically, the second network interface 206 includes logic for receiving second communication protocol messages from the fourth link 112, and further includes logic for transmitting second communication protocol messages generated within the translating apparatus 110 onto the fourth link 112.

Still referring to FIG. 2A, the translating apparatus 110 further includes control logic 204. The control logic 204 performs a translation function to allow the first device 102 to communicate with the second device 118. The control logic 204 is operably coupled to the first interface 202, through which the control logic 204 receives and transmits first communication protocol messages. The control logic 204 is also operably coupled to the second network interface 206, through which the control logic 204 receives and transmits second communication protocol messages.

In accordance with a preferred embodiment of the present invention, the first communication protocol is a protocol known as the X.25 protocol. The X.25 protocol defines the physical, link, and network layer protocols (layers one, two, and three) of the International Standards Organization (ISO) seven-layer protocol model. In a communication network that utilizes the X.25 protocol (referred to herein as an "X.25 network"), two devices (referred to herein as an "X.25 device"0 or "X.25 devices") exchange X.25 network layer messages (referred to in X.25 as "packets") over a virtual circuit that is established across the X.25 network. One type of virtual circuit commonly used in the X.25 network is a permanent virtual circuit or PVC. A PVC is a virtual circuit that is set up automatically within the X.25 network and remains active as long as the X.25 network is operative (as opposed to a switched virtual circuit or SVC, which is set up only when explicitly requested by an X.25 device). Typical X.25 networks support multiple virtual circuits, both permanent and switched.

In accordance with a preferred embodiment of the present invention, the second communication protocol is a protocol known as the Transmission Control Protocol (referred to hereinafter as "TCP"). TCP is a connection-oriented transport layer protocol that is generally used in conjunction with a connectionless network layer protocol known as the Internet Protocol or IP. In a communication network that utilizes the TCP protocol (referred to herein as a "TCP/IP network"), two devices (referred to herein as a "TCP device" or "TCP devices") exchange TCP messages (referred to in TCP as "segments") over a TCP connection that is established across the TCP/IP network. In order to set up the TCP connection within the TCP/IP network, two TCP devices exchange specially formatted messages that include, among other things, an IP address identifying the destination TCP device and a TCP port number identifying one of a number of applications supported by the destination TCP device. The combination of IP address and TCP port number is referred to hereinafter as a "socket." Because the TCP connection is set up only when explicitly requested by a TCP device, the TCP connection is considered to be a switched connection as opposed to a permanent connection.

Figure 1B:
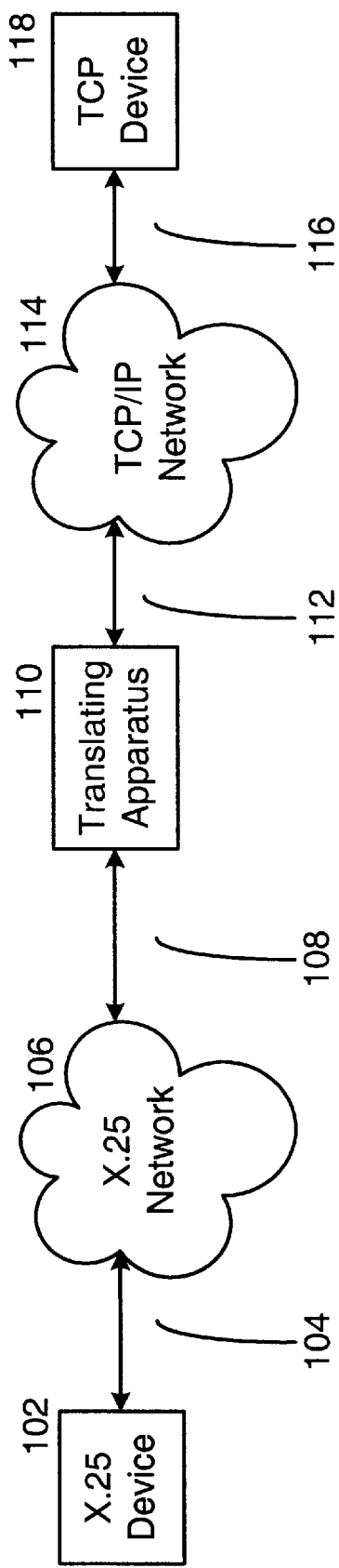
FIG. 1B is a block diagram of a preferred embodiment of the exemplary data communication network in which the translating apparatus is used to allow an X.25 device, which communicates with the translating apparatus over an X.25 network, to communicate with a TCP device, which communicates with the translating apparatus over a TCP/IP network.

FIG. 1B shows a preferred embodiment of the data communication network 100 in which the first communication protocol is the X.25 protocol and the second communication protocol is the TCP protocol. Thus, in accordance with a preferred embodiment of the present invention as shown in FIG. 1B, the X.25 device 102 communicates with the translating apparatus 110 across an X.25 network 106 using the X.25 protocol, and the TCP device 118 communicates with the translating apparatus 110 across a TCP/IP network 114 using the TCP protocol. The preferred translating apparatus 110, as shown in FIG. 1B, therefore includes an X.25 network interface 202 that includes an X.25 protocol stack for interfacing with the X.25 network 106 and a TCP/IP network interface 206 that includes a TCP/IP protocol stack for interfacing with the TCP/IP network 114.

In order for the X.25 device 102 to communicate with the TCP device 118 within the data communication network 100, it is necessary for an end-to-end connection to be established between the X.25 device 102 and the TCP device 118. In order for an end-to-end connection to exist between the X.25 device 102 and the TCP device 118, there must be both an active X.25 connection between the X.25 device 102 and the translating apparatus 110 and an active TCP connection between the translating apparatus 110 and a particular socket in the TCP device 118 (referred to hereinafter as the "destination socket"). In accordance with a preferred embodiment of the present invention, the X.25 device 102 communicates with the translating apparatus 110 over a dedicated X.25 PVC, and therefore an active X.25 connection exists between the X.25 device 102 and the translating apparatus 110 as long as the X.25 network 106 is operative. On the other hand, because the TCP device 118 communicates with the translating apparatus 110 over a switched TCP connection, the TCP connection between the translating apparatus 110 and the destination socket is established dynamically.

Furthermore, in order for the translating device 110 to provide an end-to-end connection between the X.25 device 102 and the TCP device 118, the translating apparatus 110, and particularly the control logic 204, maintains a map associating the X.25 PVC with the destination socket. In accordance with a preferred embodiment of the present invention, one X.25 PVC maps to one destination socket, and multiple X.25 PVCs can map to the same destination socket. Application data received from the X.25 device 102 over the X.25 PVC is transmitted by the translating apparatus 110, and particularly by the control logic 204, to the TCP device 118 over the corresponding TCP connection. Likewise, application data received from the TCP device 119 over the TCP connection is transmitted by the translating apparatus 110, and particularly by the control logic 204, to the X.25 device 102 over the corresponding X.25 PVC. Exemplary embodiments of control logic 204 for transferring application data between the X.25 device 102 and the TCP device 118 are described in the related U.S. patent applications Ser. Nos. 2204/105 and 2204/107.

When communication between the X.25 device 102 and the TCP device 118 is completed, it is often desirable for the end-to-end connection between the X.25 device 102 and the TCP device 118 to be terminated. Because the X.25 device 102 communicates with the translating apparatus 110 over a dedicated X.25 PVC, the X.25 connection between the X.25 device 102 and the translating apparatus 110 cannot be terminated. On the other hand, because the TCP device 118 communicates with the translating apparatus 110 over a switched TCP connection, the TCP connection between the translating apparatus 110 and a particular socket in the TCP device 118 is terminated dynamically.

In the data communication network 100, connection establishment and termination may be initiated by either the X.25 device 102 or the TCP device 118. The present patent application describes an exemplary embodiment in which the TCP device 118 initiates connection establishment and termination. An alternate embodiment in which the X.25 device 102 initiates connection establishment and termination is described in the related U.S. patent application Ser. No. 2204/108.

In accordance with a preferred embodiment of the present invention, the TCP device 118 initiates establishment of an end-to-end connection by transmitting a TCP SYN message to the translating apparatus 110. Upon receiving the TCP SYN message from the TCP device 118, the translating apparatus 110 completes a connection establishment procedure with the TCP device 118 using standard TCP message transfers. Once the TCP connection is established between the translating apparatus 110 and the TCP device 118, the TCP device 118 is able to send a TCP data segment (i.e., a TCP segment containing application data) to the translating apparatus 110. Upon receiving the TCP data segment from the TCP device 118, the translating apparatus 110 transmits to the X.25 device an X.25 data packet containing application data from the TCP data segment.

Figure 3:
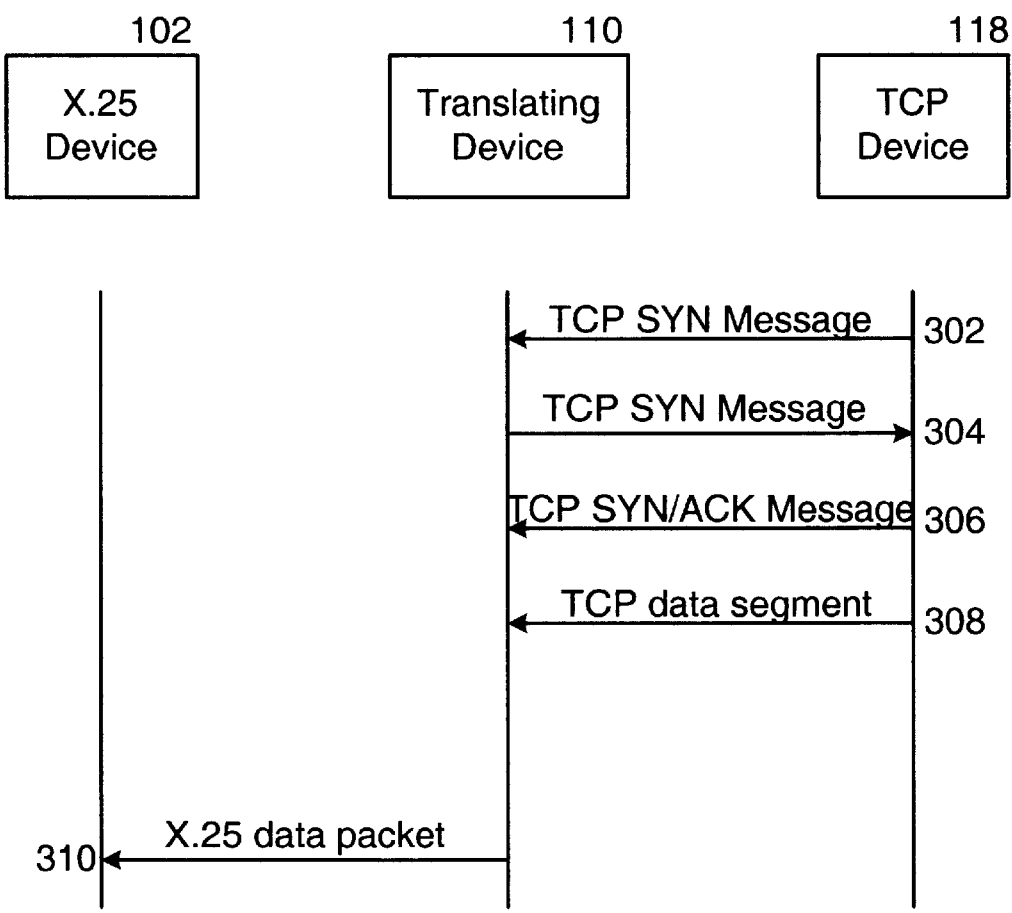
FIG. 3 is a message flow diagram for initiating an end-to-end connection from the TCP device to the X.25 device in accordance with a preferred embodiment of the present invention.

A message flow diagram for initiating an end-to-end connection from the TCP device 118 to the X.25 device 102 is shown in FIG. 3. The TCP device 118 initiates an end-to-end connection by transmitting a first TCP SYN message 302 to the translating apparatus 110. Upon receiving the first TCP SYN message 302, the translating apparatus 110 completes the TCP connection establishment procedure by transmitting a second TCP SYN message 304 to the TCP device 118 and waiting for a TCP SYN/ACK message 306 in response from the TCP device 118. Once the TCP connection is established between the translating apparatus 110 and the TCP device 118, the TCP device 118 transmits a TCP data segment 308 to the translating apparatus 110. Upon receiving the TCP data segment 308 from the TCP device 118, the translating apparatus 110 transmits to the X.25 device an X.25 data packet 310 containing application data from the TCP data segment.

Figure 4:
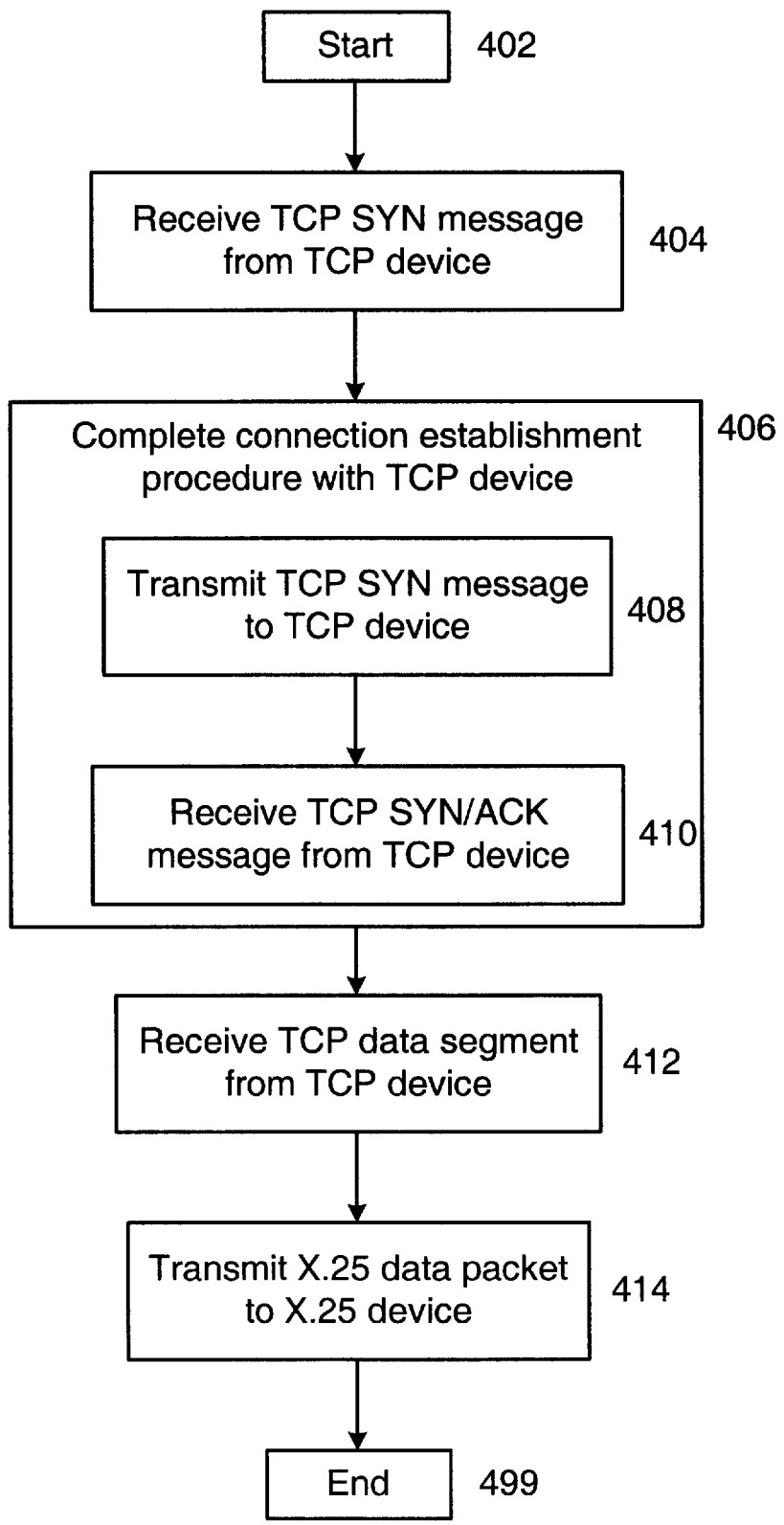
FIG. 4 is a logic flow diagram of exemplary control logic for initiating an end-to-end connection from the TCP device to the X.25 device in accordance with a preferred embodiment of the present invention.

Thus, the translating apparatus 110, and particularly the control logic 204, includes logic for establishing an end-toend connection from the X.25 device 102 to the TCP device 118. More specifically, the control logic 204 includes logic for performing a set of steps as shown in FIG. 4. Beginning at step 402, the control logic 204 first receives the TCP SYN message 302, in step 404. Then, the control logic 204 completes a connection establishment procedure with the TCP device 118, in step 406. As described above, completing the connection establishment procedure in step 406 involves transmitting a TCP SYN message 304 to the TCP device 118 (step 408) and receiving a TCP SYN/ACK message 306 in response from the TCP device 118 (step 410). Once the TCP connection is established in step 406, the control logic 204 receives from the TCP device 118 a TCP data segment 308 containing application data, in step 412. Upon receiving the TCP data segment 308 in step 412, the translating apparatus 110 transmit to the X.25 device 102 an X.25 data packet 310 containing application data from the TCP data segment 308, and terminates in step 499.

In order for an end-to-end connection between the X.25 device 102 and the TCP device 118 to be terminated, the TCP connection between the TCP device 118 and the translating apparatus 110 must be terminated. In accordance with a preferred embodiment of the present invention, the TCP device 118 initiates termination of an end-to-end connection by transmitting a TCP FIN message to the translating apparatus 110. Upon receiving the TCP FIN message from the TCP device 118, the translating apparatus 110 completes a link reset procedure with the X. 25 device 102 to suspend data flow between the X.25 device 102 and the translating apparatus 110. The translating apparatus 110 then completes a connection termination procedure with the TCP device 118.

Figure 5:
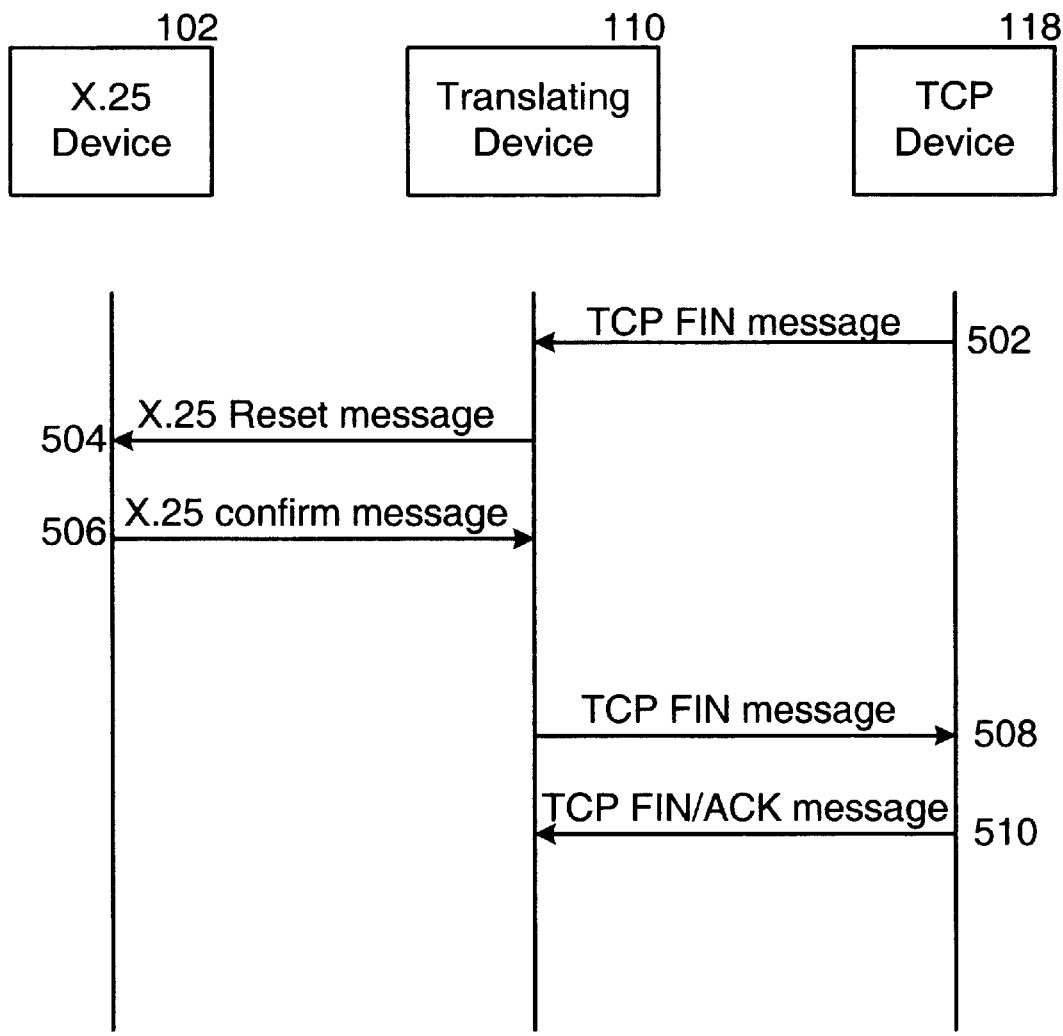
FIG. 5 is a message flow diagram for terminating an end-to-end connection from the TCP device to the X.25 device in accordance with a preferred embodiment of the present invention.

A message flow diagram for terminating an end-to-end connection from the TCP device 118 to the X.25 device 102 is shown in FIG. 5. The TCP device 118 initiates termination of an end-to-end connection by transmitting a TCP FIN message 502 to the translating apparatus 110. Upon receiving the TCP FIN message 502, the translating apparatus 110 resets the X.25 connection between the X.25 device 102 and the translating apparatus 110 by transmitting an X.25 reset message 504 to the X.25 device 102 and receiving from the X.25 device 102 an X.25 confirm message 506. Upon receiving the X.25 confirm message 506 from the X.25 device 102, the translating apparatus completes the connection termination procedure with the TCP device 118 by transmitting a TCP FIN message 508 to the TCP device 118 and receiving from the TCP device 118 a TCP FIN/ACK message.

Figure 6:
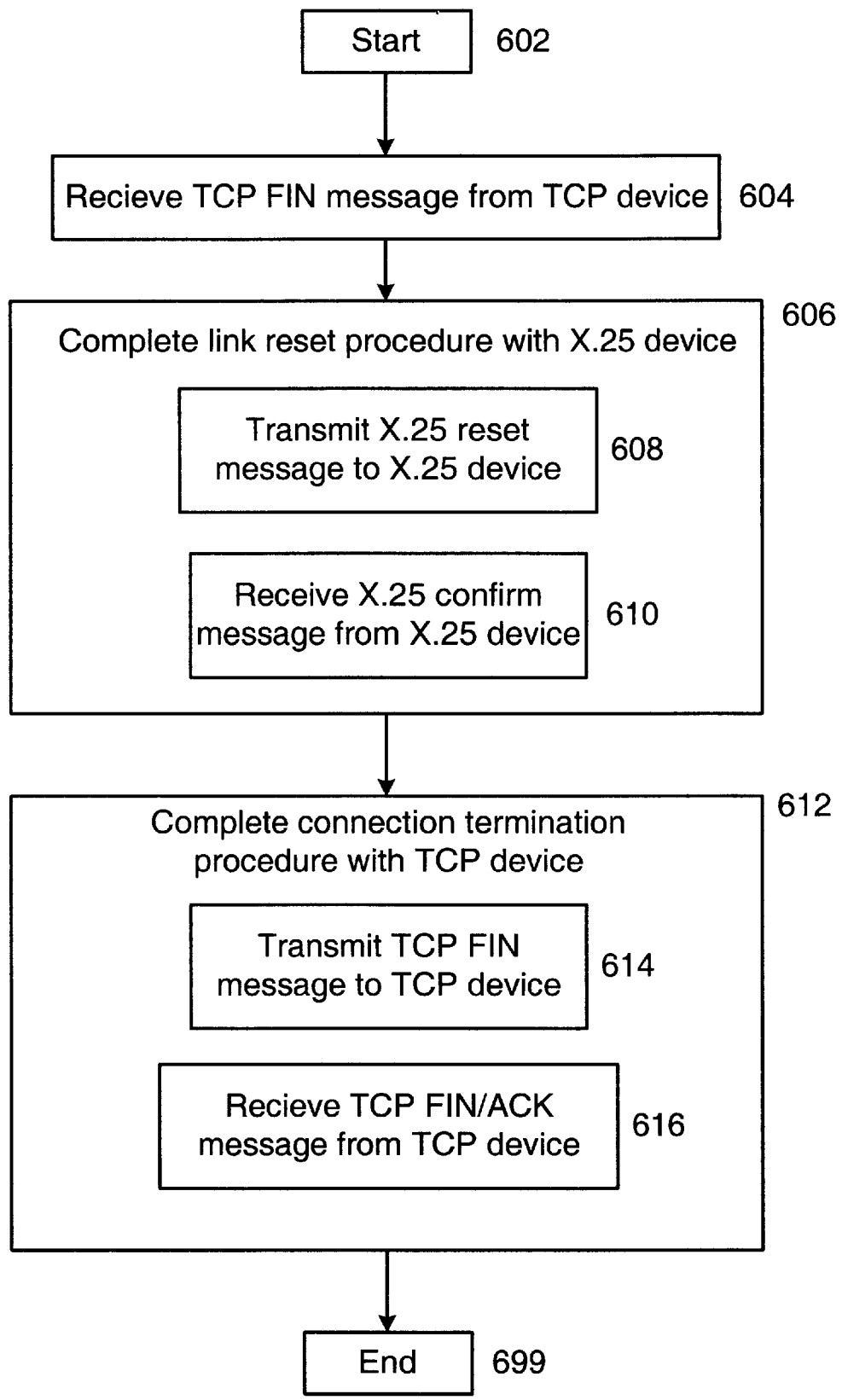
FIG. 6 is a logic flow diagram of exemplary control logic for terminating an end-to-end connection from the TCP device to the X.25 device in accordance with a preferred embodiment of the present invention.

Thus, the translating apparatus 110, and particularly the control logic 204, includes logic for terminating an end-to-end connection from the TCP device 118 to the X. 25 device 102. More specifically, the control logic 204 includes logic for performing a set of steps as shown in FIG. 6. Beginning at step 602, the control logic 204 first receives the TCP FIN message 502, in step 604. Then, the control logic 204 completes a link reset procedure with the X.25 device 102, in step 606. As described above, completing the link reset procedure with the X.25 device 102 in step 606 involves transmitting the X.25 reset message 504 to the X.25 device 102 (step 608) and receiving the X.25 confirm message 506 from the X.25 device 102 (step 610). After completing the link reset procedure with the X.25 device 102 in step 606, the translating apparatus 110 completes the connection termination procedure with the TCP device 118, in step 612. As described above, completing the connection termination procedure with the TCP device 118 in step 612 involves transmitting the TCP FIN message 508 to the TCP device 118 (step 614) and receiving the TCP FIN/ACK message 510 from the TCP device 118 (step 616). The control logic 204 terminates in step 699.

Although the various embodiments are described with specific reference to a translating apparatus for enabling communication between an X.25 device and a TCP device, it will be apparent to a skilled artisan that the techniques of the present invention apply more generally to a translating apparatus for enabling communication between two devices supporting different communication protocols. Thus, the translating apparatus enables communication between a first device utilizing a first communication protocol and a second device utilizing a second communication protocol. More specifically, the first device communicates with the translating apparatus using the first communication protocol, and the second device communicates with the translating apparatus using the second communication protocol. The translating apparatus performs the functions necessary to establish an end-to-end connection between the first device and the second device, for example, as described herein and in the related U.S. patent application Ser. No. 09/167,916; terminate an end-to-end connection between the first device and the second device, for example, as described herein and in the related U.S. patent application Ser. No. 09/167,916; recover from connection failures as described in the related U.S. patent applications Ser. Nos. 09/167,746 and 09/167,950, and exchange application data as described in the related U.S. patent applications Ser. Nos. 2204/105 and 09/167,811.

In a preferred embodiment of the present invention, the control logic 204 is implemented as a set of program instructions that are stored in a computer readable memory within the translating apparatus 110 and executed on a microprocessor within the translating apparatus 110. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific terms without departing from the essence or essential characteristics. The described embodiments are to considered in all respects only as illustrative and not restrictive.

What is claimed is:

1. In a translating apparatus having a first communication interface for communicating with a first device using a first communication protocol and a second communication interface for communicating with a second device using a second communication protocol different from said first communication protocol, a method of terminating a connection between said first device and said second device, the method comprising the steps of:

receiving from said second device over said second communication interface a first control message terminating a connection between said second device and said translating apparatus;

completing a link reset procedure with said first device over said first communication interface; and completing a connection termination procedure with said second device over said second communication interface.

2. The method of claim 1 wherein said second communication protocol is a Transmission Control Protocol (TCP)

and wherein the step of receiving from said second device over said second communication interface the first control message terminating a connection between said second device and said translating apparatus comprises receiving a first TCP FIN message as part of a TCP close procedure.

3. The method of claim 2 wherein the step of completing the connection termination procedure with said second device over said second communication interface comprises the steps of:

transmitting to said second device over said second communication interface a second TCP FIN message as part of the TCP close procedure; and receiving from said second device over said second communication interface a TCP FIN/ACK message as part of the TCP close procedure.

4. The method of claim 1 wherein said first communication protocol is an X.25 protocol and wherein the step of completing the link reset procedure with said first device over said first communication interface comprises the steps of:

transmitting to said first device over said first communication interface an X.25 reset message; and receiving from said first device over said first communication interface an X.25 confirm message.

5. An apparatus comprising a computer readable medium having embodied therein computer readable program code means for communicating with a first device using a first communication protocol, communicating with a second device using a second communication protocol different from said first communication protocol, and terminating a connection between said first device and said second device, the computer readable program code means comprising:

computer readable program code means for receiving from said second device a first control message terminating a connection with said second device;

computer readable program code means for completing a link reset procedure with said first device; and computer readable program code means for completing a connection termination procedure with said second device.

6. A translating apparatus comprising:

a first communication interface couplable to a first device for communicating with said first device using a first communication protocol;

a second communication interface couplable to a second device for communicating with said second device using a second communication protocol different from said first communication protocol; and control logic coupled to said first communication interface and said second communication, said control logic comprising:

logic for receiving from said second device over said second communication interface a first control message terminating a connection between said second device and said translating apparatus;

logic for completing a link reset procedure with said first device over said first communication interface; and logic for completing a connection termination procedure with said second device over said second communication interface.

7. The translating apparatus of claim 6 wherein said second communication protocol is a Transmission Control Protocol (TCP) and wherein said logic for receiving from said second device over said second communication interface the first control message terminating a connection between said second device and said translating apparatus comprises logic for receiving a first TCP FIN message as part of a TCP close procedure.

8. The translating apparatus of claim 7 wherein said logic for completing the connection termination procedure with said second device over said second communication interface comprises:

logic for transmitting to said second device over said second communication interface a second TCP FIN message as part of the TCP close procedure; and logic for receiving from said second device over said second communication interface a TCP FIN/ACK message as part of the TCP close procedure.

9. The translating apparatus of claim 6 wherein said first communication protocol is an X.25 protocol and wherein said logic for completing the link reset procedure with said first device over said first communication interface comprises:

logic for transmitting to said first device over said first communication interface an X.25 reset message; and logic for receiving from said first device over said first communication interface an X.25 confirm message.

10. In a system having a first device in communication with a translating apparatus using a first communication protocol and a second device in communication with said translating apparatus using a second communication protocol different from said first communication protocol, a method of terminating a connection between said first device and said second device, the method comprising the steps of:

transmitting, by said second device to said translating apparatus, a first control message terminating a connection between said second device and said translating apparatus;

receiving said first control message by said translating apparatus;

completing a link reset procedure between said translating apparatus and said first device; and completing a connection termination procedure between said translating apparatus and said second device.

11. The method of claim 10 wherein said second communication protocol is a Transmission Control Protocol (TCP) and wherein said first control message comprises a first TCP FIN message.

12. The method of claim 11 wherein the step of completing the connection termination procedure between said translating apparatus and said second device comprises the steps of:

transmitting, by said translating apparatus to said second device, a second TCP FIN message;

receiving said second TCP FIN message by said second device;

transmitting, by said second device to said translating apparatus, a TCP FIN/ACK message; and receiving said TCP FIN/ACK message by said translating apparatus.

13. The method of claim 10 wherein said first communication protocol is an X.25 protocol and wherein the step of completing the link reset procedure between said translating apparatus and said first device comprises the steps of:

transmitting, by said translating apparatus to said first device, an X.25 reset message;

receiving said X.25 reset message by said first device;

transmitting, by said first device to said translating apparatus, an X.25 confirm message; and receiving said X.25 confirm message by said translating apparatus.

* * * * *